United States Patent
Smith

(10) Patent No.: US 7,371,268 B2
(45) Date of Patent: May 13, 2008

(54) FILTER WITH THERMAL VENT

(75) Inventor: Gregory C. Smith, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 386 days.

(21) Appl. No.: 10/830,738

(22) Filed: Apr. 23, 2004

(65) Prior Publication Data

US 2005/0235614 A1   Oct. 27, 2005

(51) Int. Cl.
*B01D 47/00* (2006.01)

(52) U.S. Cl. ........... 55/385.4; 55/310; 55/385.5; 55/498; 55/315; 55/502; 55/510; 52/98; 96/18; 126/263.08; 126/263.09; 165/81

(58) Field of Classification Search ........... 55/310, 55/385.4, 385.5, 498, DIG. 17, 315, 502, 55/510; 96/18; 52/98; 165/81; 126/263.08, 126/263.09
See application file for complete search history.

(56) References Cited

U.S. PATENT DOCUMENTS

| 4,238,207 A | * | 12/1980 | Ruschke | 96/6 |
|---|---|---|---|---|
| 4,248,610 A | * | 2/1981 | Schminke et al. | 96/18 |
| 6,527,839 B2 | * | 3/2003 | Fornof et al. | 96/136 |
| 6,726,752 B2 | * | 4/2004 | Chen | 96/190 |
| 7,008,472 B2 | * | 3/2006 | Fornof et al. | 96/136 |
| 7,100,305 B2 | * | 9/2006 | Hoffman et al. | 34/351 |
| 2003/0110949 A1 | | 6/2003 | Fornof et al. | |
| 2006/0162344 A1 | * | 7/2006 | Scudder et al. | 62/4 |

* cited by examiner

*Primary Examiner*—Duane Smith
*Assistant Examiner*—Minh-Chau T. Pham
(74) *Attorney, Agent, or Firm*—Calfee, Halter & Griswold LLP

(57) ABSTRACT

A compressed air filtering cartridge includes a housing and a filter in the housing, the filter having a thermal vent. In one embodiment the filter includes a wall portion having a first condition when below a predetermined temperature range in which the wall portion blocks flow of air between opposite sides of the wall portion. The wall portion has a second condition when above the predetermined temperature range in which the wall portion does not block flow of air between opposite sides of the wall portion. The cartridge may be part of a compressed air system, between a compressor and an air dryer.

29 Claims, 2 Drawing Sheets

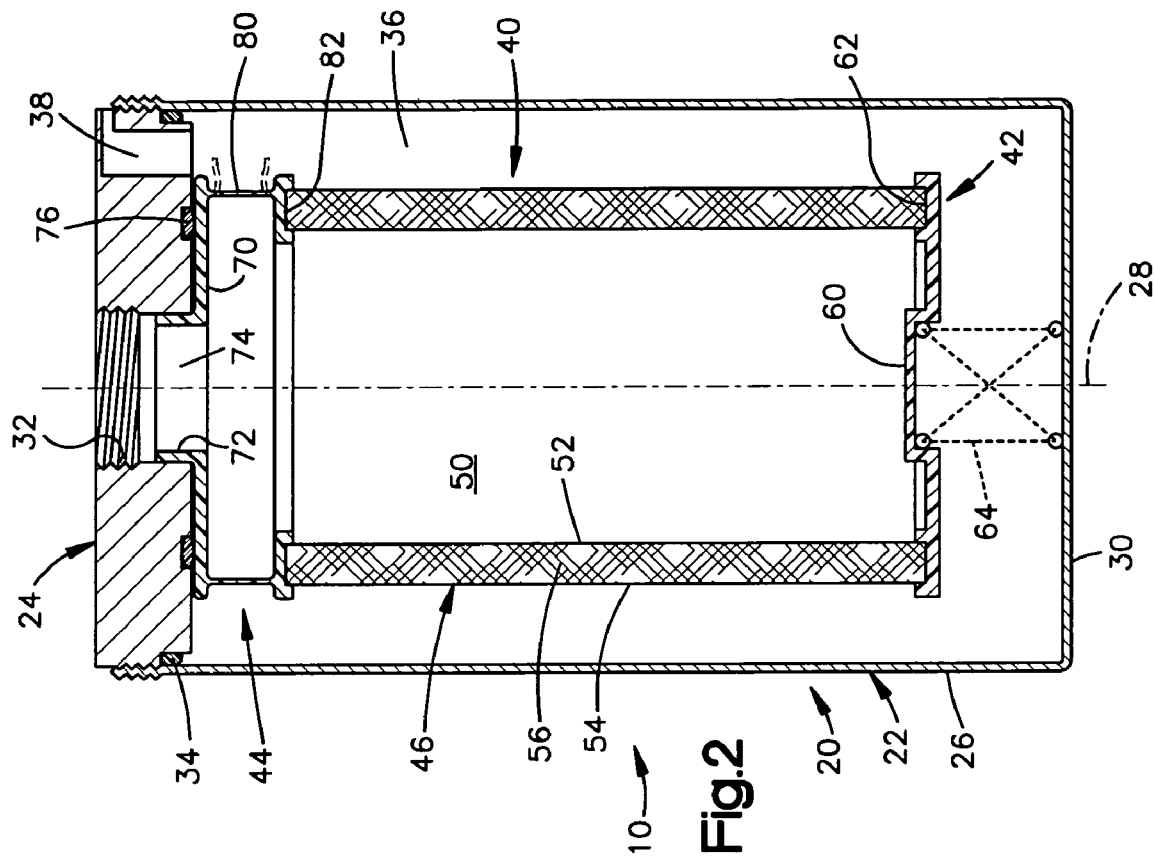
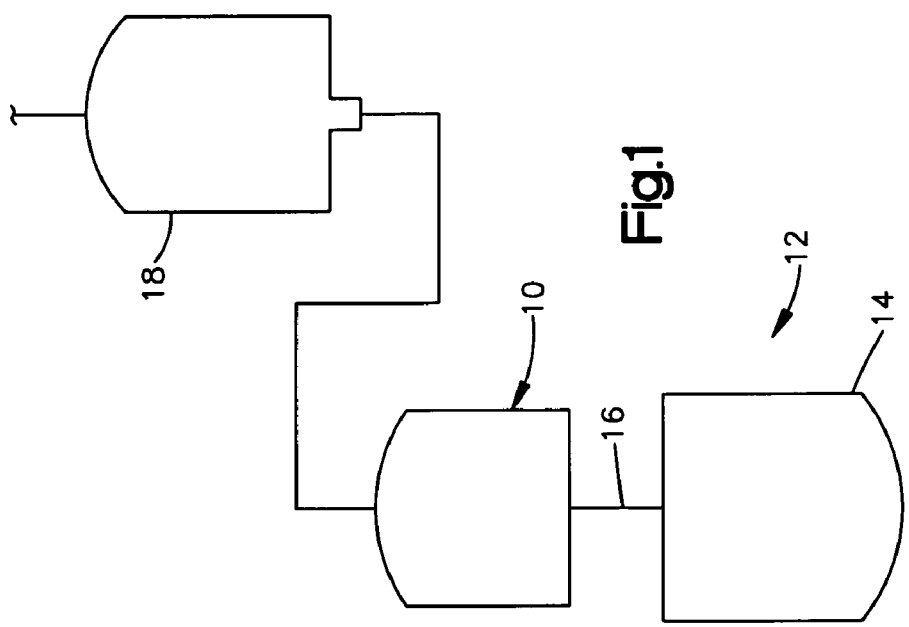

FILTER WITH THERMAL VENT

BACKGROUND OF THE INVENTION

1. Field of the Invention

The present invention relates to filtering devices used in combination with compressed air, heavy vehicle braking systems. More particularly, the present invention is directed to a filtering cartridge that is disposed downstream of an air brake compressor and that has a thermal venting capability.

2. Description of the Prior Art

Compressed air systems are used in vehicles to provide and maintain air under pressure to operate vehicle brakes and associated auxiliary air systems. Conventional systems include an air compressor for generating pressurized air and a drying device or air dryer disposed downstream from the compressor for removing entrained liquid from the air. The air dryer includes a desiccant material that removes water vapor from the air as it passes therethrough.

Air brake compressors are typically supplied with oil from the vehicle engine in order to lubricate the bearings and other components of the compressor. However, because oil is difficult to contain, a small portion of the lubricating oil passes into the pressurized air stream exiting the compressor in the form of oil vapor and carbon particles. If air exiting the compressor passes directly to the downstream components, elastomeric seals and seats of the components, as well as the desiccant material housed within the air dryer, can become contaminated with the oil and carbon.

Therefore, some vehicle air brake systems are provided with a filter cartridge located immediately downstream of the compressor. The filter cartridge includes a filter located in a housing. The filter is spring biased against an inlet end of the housing. Air flowing into the filter housing is directed to flow through the filter before it flows out of the housing. The filter causes the oil vapor and carbon particles to coalesce in the filter, thus preventing it from flowing downstream to the operating components of the braking system.

The coalesced oil and carbon has an autoignition temperature of around 400° F. If it ignites within the filter it can cause major damage to the vehicle. U.S. Patent Application Publication No. 2003/0110949 A1 discloses a spin-on filtering cartridge that includes a thermal vent. With the thermal vent, pressure is released from the cartridge upon reaching a threshold temperature.

In the known filter cartridge, a pressure increase due to filter clogging can cause the filter to compress the spring and move away from the inlet end of the housing, allowing air to flow freely around the filter.

SUMMARY OF THE INVENTION

The present invention relates in one aspect to a compressed air filtering cartridge comprising a housing and a filter in the housing, the filter having a thermal vent.

In another aspect the present invention relates to a filtering cartridge comprising a housing and a filter in the housing for filtering air that is flowing through the housing. The filter includes a wall portion having a first condition when below a predetermined temperature range in which the wall portion blocks flow of air between opposite sides of the wall portion. The wall portion has a second condition when above the predetermined temperature range in which the wall portion does not block flow of air between opposite sides of the wall portion.

In a further aspect the present invention relates to a cartridge for removing material from air flowing through the cartridge. The cartridge includes a housing defining a first chamber, and a filter in the first chamber in the housing, the filter defining a second chamber inside the filter. The cartridge includes means responsive to a temperature in a predetermined temperature range for venting air from the second chamber to the first chamber.

In still another aspect, the present invention relates to a compressed air system comprising a compressor for generating compressed air. A filtering cartridge is disposed downstream from the compressor. The cartridge includes a housing having an air inlet and an air outlet. The cartridge also includes a filter disposed within the housing between the air inlet and the air outlet, the filter including a thermal vent. The system also includes an air dryer disposed downstream from the filtering cartridge.

In yet another aspect, the present invention relates to a method comprising the steps of directing compressed air through an inlet of a housing and through an inlet of a filter in a housing into a chamber in the filter; filtering the compressed air; directing the filtered air from the chamber in the filter to the chamber in the housing and through an outlet of the housing; blocking flow of unfiltered air from the chamber in the filter to the chamber in the housing when the temperature of the filter is below a predetermined temperature range; and enabling flow of unfiltered air from the chamber in the filter to the chamber in the housing when the temperature of the filter is above a predetermined temperature range.

BRIEF DESCRIPTION OF THE DRAWINGS

FIG. 1 is a schematic illustration of a portion of a compressed air system for a vehicle braking system including a filtering cartridge in accordance with the present invention;

FIG. 2 is an enlarged schematic view, partially in section, of the filtering cartridge of FIG. 1, shown in solid lines in a non-venting condition and in dashed lines in a venting condition.

DETAILED DESCRIPTION OF THE INVENTION

Figure 3:
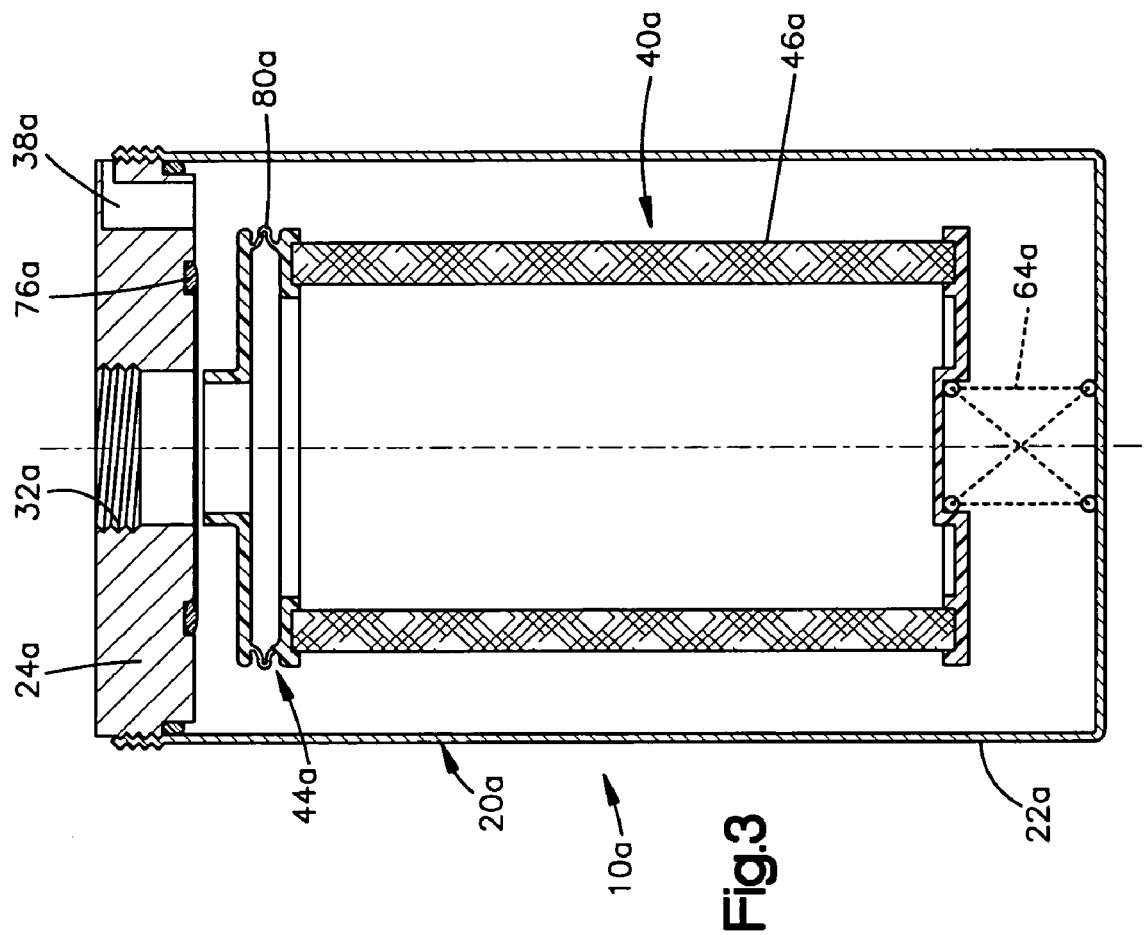
FIG. 3 is a view similar to FIG. 2 of a filtering cartridge constructed in accordance with a second embodiment of the invention, shown in a venting condition.

The present invention relates to filtering devices used, for example, in combination with compressed air, heavy vehicle braking systems. More particularly, the present invention is directed to a filtering cartridge that is disposed downstream from an air brake compressor and that has a thermal venting capability. The invention is applicable to filtering cartridges of varying constructions. As representative of the invention, FIGS. 1 and 2 illustrate a cartridge 10 constructed in accordance with a first embodiment of the invention. The cartridge forms part of a compressed air system 12 for a vehicle air braking system.

The compressed air system 12 includes a compressor 14. The compressor 14 pressurizes air in a conventional manner, for example, by using a piston (not shown) slidable within a bore (not shown) of the crank case. Dynamic components of the compressor 14, such as a crank shaft and piston and cylinder, are lubricated with oil delivered from a vehicle engine or other means (not shown). Oil in the form of oil vapor and carbon particles migrates into the pressurized air stream, which exits the compressor 14 through a port 16 of the compressor. The cartridge 10 is located inline between the compressor 14 and an air dryer 18.

The cartridge 10 (FIG. 2) includes a housing 20, which is the exterior portion of the cartridge. In the illustrated embodiment, the housing 20 is a metal container that includes a cup 22 and an end plate 24. The cup 22 has a cylindrical configuration including a cylindrical side wall 26 centered on an axis 28 and an end wall 30 which may be flat as shown or which may be curved or domed. The end plate 24 is a metal body having a threaded central opening 32 adapted to be screwed onto another portion of the vehicle air system. The housing 20 may also include a drain plug (not shown).

The cup 22 of the housing 20 is screwed onto the end plate 24 at a joint that is sealed by an O-ring 34, for example. As a result, the cup 22 is removable from the end plate 24 to enable removal and replacement of the portions of the cartridge that are inside the cup. The cup 22 and the end plate 24 define a chamber 36 in the housing 20.

The central opening 32 of the end plate 24 serves as an air inlet through which air to be filtered is admitted into the housing 20 and thus into the cartridge 10. The end plate 24 also has an air outlet 38. The air outlet 38 is located near the radially outer edge of the end plate 24. The air outlet 38 provides fluid communication between the interior of the housing 20 and the exterior of the cartridge 10, so that air that is admitted into the cartridge through the inlet 32, and filtered, can be directed out of the cartridge and back into the vehicle air system 12.

A filter 40 is located in the chamber 36 in the housing 20. The filter 40 is a removable element for cleaning, or filtering, air that flows through the cartridge 10 between the inlet 32 and the outlet 38.

The filter 40 may take many different forms in different embodiments of the invention. In the illustrated embodiment, the filter 40 includes first and second polypropylene end caps 42 and 44 located at opposite ends of a filtering element 46. The filtering element 46 includes inner and outer side walls 52 and 54 that are wire mesh. Within the side walls 52 and 54 is a coalescing filter medium 56.

The end caps 42 and 44 and the filtering element 46 define a second chamber 50. The second chamber 50 is located in the filter 40, which is located in the first chamber 36 of the housing 20. As a result, the second chamber 50 is located within the first chamber 36.

The first end cap 42 of the filter 40 is a generally disc-shaped member having a central recess 60 and an outer peripheral channel 62. The recess 60 receives one end of a spring 64 whose opposite end engages the end wall 30 of the cup 22. The outer peripheral channel 62 of the first end cap 42 receives one end of the filtering element 46.

The second end cap 44 of the filter 40 has a disc-shaped end wall 70 with a protruding central boss 72 around a central opening 74. The central opening 74 forms an inlet of the filter 40. The boss 72 is received in the central opening 32 of the end plate 24 of the housing 20. As a result, the filter 40 is resiliently supported in the housing 20 between the housing end plate 24 and the end wall 30 of the cup 22. The central opening or inlet 74 of the filter 40 is aligned with and in fluid communication with the central opening or inlet 32 of the housing 20. An O-ring 76 recessed in the end plate 24 of the housing 20 provides a seal between the filter 40 and the housing.

The second end cap 44 of the filter 40 has a cylindrical side wall portion 80, at the outer periphery of the end wall 70. The side wall portion 80 terminates in an annular channel 82 that receives one end of the filtering element 46. The filtering element 46 is thus supported between the end caps 42 and 44 of the filter 40.

The first and second end caps 42 and 44 of the filter 40 are made from a material that is strong enough to support the filtering element 46 in the housing 20, while solid so that it blocks air flow, thus causing all the air to be directed through the filtering element. A preferred material is polypropylene.

The side wall portion 80 of the second end cap 44 is thus made from a material that blocks flow of air from one side (for example, the inside) of the wall portion, to the other side (for example, the outside) of the wall portion. As a result, air that flow into the cartridge 10 through the fluid inlet 32 and through the filter inlet 74 into the second chamber 50, must flow out of the second chamber through the filtering element 46 and into the first chamber 36, before it exits the cartridge via the air outlet 38. This flow path ensures that all the air is directed through the filtering element 46.

Under certain circumstances of operation, it is conceivable that the temperature inside the cartridge 10 might rise to an unacceptable level. For example, the filtering element 46 might become clogged and excessive back pressure and heat might then be generated by the compressor 14. In such a circumstance, the temperature of the coalesced oil and carbon on the filtering element 46 might rise to its autoignition temperature. This undesirable result is avoided in the present invention by the thermal vent of the filter 40, which enables the pressure inside the first chamber 36 and/or the second chamber 50 to be vented. The thermal vent is something in or part of the filter that changes due to temperature, in a deliberate manner, to enable venting of air—that is, to enable flow of air from the air inlet of the housing to the air outlet of the housing, without having to flow through the filtering element.

In the first embodiment of the invention, the thermal vent includes a side wall portion 80 of the second end cap 44 of the filter 40. This wall portion 80 is rupturable when its temperature reaches or exceeds a predetermined temperature, or a predetermined temperature range. The predetermined temperature, or the predetermined temperature range, is selected to be below the autoignition temperature of the coalesced materials that are captured in the cartridge 10. One suitable range is 311° F. to 329° F.

The side wall portion 80 can be made rupturable in differing manners. As one example, the side wall portion 80 might rupture because of weakening, or softening, or melting of the polypropylene material.

If the temperature in the cartridge 10 reaches or exceeds the predetermined temperature or temperature range, the side wall portion 80 ruptures, as shown schematically in dashed lines in FIG. 2. When this occurs, a second flow path is established for the air in the housing 20. The air that enters the filter 40 through the inlets 32 and 70 can flow out of the filter through the ruptured wall portion 80, which no longer blocks air flow, instead of only through the filtering element 46. The ruptured wall portion 80 is separate and distinct from the air outlet 38 of the housing 20.

The air thus flows from the second chamber 50 to the first chamber 36, without passing through the filtering element 46. Once in the first chamber 36, the air can exit the cartridge 10 through the existing air outlet 38 of the housing 20. With this free flow path for air, the filter 40 no longer acts as a restrictive element. The pressure and thereby the temperature in the cartridge 10 decrease, to a safer level.

A part of the filter 40 other than the side wall portion 80 may be rupturable or collapsible. In the illustrated embodiment, the side wall portion 80 is chosen as the rupturable portion because it is close to the air inlet 32 and outlet 38 of the housing 20, to allow freer flow of air through the housing.

FIG. 3 illustrates a filter cartridge 10*a* in accordance with a second embodiment of the invention. The cartridge 10*a* is similar in construction to the cartridge 10 (FIG. 2) and parts that are the same or similar are given the same reference numerals with the suffix "a" added to distinguish.

In the cartridge 10*a*, the thermal vent includes a side wall portion 80*a* of the filter 40*a* that is constructed to collapse axially, rather than rupture, when heated to a temperature at or above the predetermined temperature range. The cartridge 10*a* and its operation take advantage of the fact that the filter 40*a* is loaded axially between the spring 64*a* and the end plate 24*a* of the housing 20*a*. The spring load is selected to hold the filter 40*a* (which is a particular, known length) in place in the housing 20*a* under normal inlet air pressures.

Should the temperature in the housing 20*a* rise to the predetermined temperature or temperature range, the side wall portion 80*a* softens and collapses as shown in FIG. 3. The filter 40*a* is effectively shortened. The spring 64*a* pushes the filter 40*a* bodily toward the end plate 24*a* of the housing 20*a*, to the point where the spring is extended enough that its spring force is no longer sufficient to hold the filter against the end plate with the amount of force needed to withstand the pressure of the incoming air. The incoming air pressure forces the filter 40*a* back away from the end plate 24*a*. The seal between the filter 40*a* and the O-ring 76*a* is broken, allowing incoming air to bypass the filter and flow directly from the inlet 32*a* to the outlet 38*a*. The desired positioning of the filter at a location off the end plate of the housing might be achieved in a manner other than as shown—that is, other than by relying on the limit of extension of the spring. As one example, a mechanical stop or other device could be provided to limit the amount of extension of the spring, so that when the filter shortens, it can move away from the end plate of the housing.

Having described the invention, I claim:

1. A filtering cartridge comprising:
   a housing; and
   a filter in said housing for filtering air that is flowing through said housing, said filter including a wall portion having a first condition when below a predetermined temperature range in which said wall portion blocks flow of air between opposite sides of said wall portion, said wall portion having a second condition when above the predetermined temperature range in which said wall portion does not block flow of air between opposite sides of said wall portion.

2. A cartridge as set forth in claim 1 wherein said housing defines a first chamber in which said filter is located, said filter defining a second chamber located in said first chamber, said wall portion when below the predetermined temperature range blocking air flow between said first chamber and said second chamber.

3. A cartridge as set forth in claim 1 wherein said wall portion of said filter is rupturable when above the predetermined temperature range.

4. A cartridge as set forth in claim 1 wherein said wall portion of said filter is collapsible when above the predetermined temperature range.

5. A cartridge as set forth in claim 1 wherein said wall portion is formed as one piece with an end cap of said filter.

6. A cartridge as set forth in claim 1 wherein said wall portion is rupturable and is formed as one piece with an end cap of said filter and is located near an outlet of said housing.

7. A cartridge as set forth in claim 1 wherein said wall portion is made of polypropylene.

8. A cartridge for removing material from air flowing through said cartridge, said cartridge comprising:
   a housing defining a first chamber;
   a filter element in said first chamber in said housing, said filter element defining a second chamber inside said filter element; and
   means, on the filter element, responsive to a temperature in a predetermined temperature range for venting air from said second chamber to said first chamber.

9. A cartridge as set forth in claim 8 wherein said means for venting comprises a wall portion of said filter element that is rupturable upon reaching said predetermined temperature range.

10. A cartridge as set forth in claim 8 wherein said means for venting comprises a wall portion of said filter element that is collapsible upon reaching said predetermined temperature range.

11. A cartridge as set forth in claim 8 wherein said first chamber has a housing inlet for admitting air into said housing and a housing outlet for directing air out of said housing, and said second chamber has a filter element inlet for admitting air into said filter element from said housing and a filter element outlet for directing air out of said filter element into said first chamber, said means for venting being separate from said filter element outlet.

12. A cartridge as set forth in claim 8 wherein said wall portion is made of polypropylene.

13. A compressed air filtering cartridge comprising cartridge, comprising:
   a housing; and
   a filter element in said housing, a thermal vent being included on the filter element.

14. A cartridge as set forth in claim 13 wherein said thermal vent comprises a portion of said filter element that is rupturable in response to a temperature in a predetermined temperature range.

15. A cartridge as set forth in claim 13 wherein said thermal vent comprises a portion of said filter element that is collapsible in response to a temperature in a predetermined temperature range.

16. A cartridge as set forth in claim 13 wherein said housing defines a first chamber in which said filter element is located, said filter element defining a second chamber located in said first chamber, said thermal vent when below the predetermined temperature range blocking air flow between said first 5 chamber and said second chamber.

17. A cartridge as set forth in claim 13 wherein said thermal vent comprises thin walled polypropylene.

18. A compressed air system comprising:
   a compressor for generating compressed air;
   a filtering cartridge disposed downstream from the compressor, said cartridge including a housing having an air inlet and an air outlet, said cartridge also including a filter element disposed within the housing between the air inlet and the air outlet, a thermal vent being included on the filter element; and
   an air dryer disposed downstream from the filtering cartridge.

19. A system as set forth in claim 18 wherein said filter element includes a wall portion that is rupturable when at or above a predetermined temperature range.

20. A system as set forth in claim 18 wherein said filter element includes a wall portion that is collapsible when at or above a predetermined temperature range.

21. A cartridge as set forth in claim 18 wherein said wall portion is made of polypropylene.

22. A method comprising the steps of:
directing compressed air through an inlet of a housing and through an inlet of a filter in a housing into a chamber in the filter;
filtering the compressed air;
directing the filtered air from the chamber in the filter to the chamber in the housing and through an outlet of the housing;
blocking flow of unfiltered air from the chamber in the filter to the chamber in the housing when the temperature of the filter is below a predetermined temperature range; and
enabling flow of unfiltered air from the chamber in the filter to the chamber in the housing when the temperature of the filter is above a predetermined temperature range.

23. A method as set forth in claim 22 wherein said enabling step comprises changing the condition of a portion of the filter.

24. A method as set forth in claim 23 wherein said step of changing the condition of a portion of the filter comprises rupturing a portion of the filter.

25. A method as set forth in claim 23 wherein said step of changing the condition of a portion of the filter comprises collapsing a portion of the filter.

26. A method as set forth in claim 25 wherein said enabling step comprises moving the filter away from a portion of the housing to break a seal and allow flow of unfiltered air through the housing.

27. A filter for a use in a housing of a filtering cartridge for filtering compressed air, the housing having an air inlet and an air outlet, said filter comprising:
a filtering element; and
a thermal vent in the filtering element.

28. A filter as set forth in claim 27 wherein said thermal vent comprises a portion of said filtering element that is rupturable in response to a temperature in a predetermined temperature range.

29. A filter as set forth in claim 27 wherein said thermal vent comprises a portion of said filtering element that is collapsible in response to a temperature in a predetermined temperature range.

* * * * *